E. BROCKETT.
SOCKET AND CLAMP FOR DIPPER STAFF HANDLES.
APPLICATION FILED JULY 25, 1916.

1,237,163.

Patented Aug. 14, 1917.
2 SHEETS—SHEET 1.

Witnesses
J. H. Crawford
Edwin Dowd

Inventor
Earl Brockett,
By Victor J. Evans
Attorney

E. BROCKETT.
SOCKET AND CLAMP FOR DIPPER STAFF HANDLES.
APPLICATION FILED JULY 25, 1916.
1,237,163.
Patented Aug. 14, 1917.
2 SHEETS—SHEET 2.
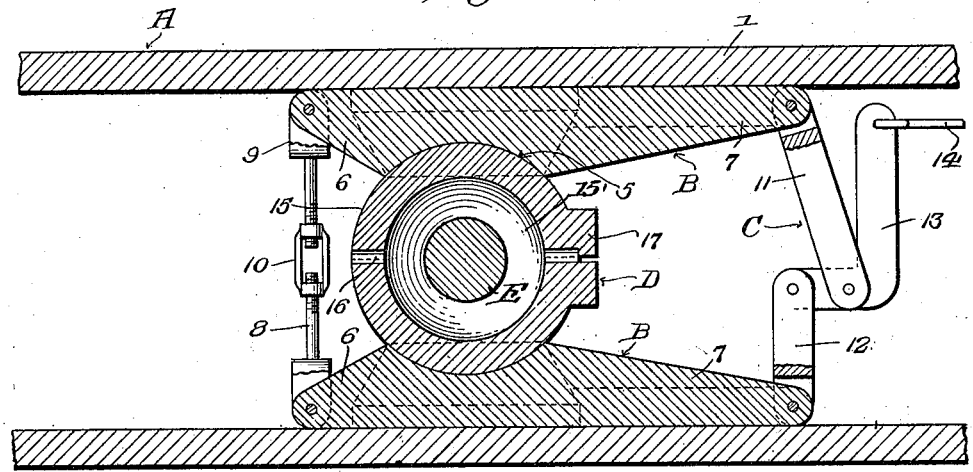
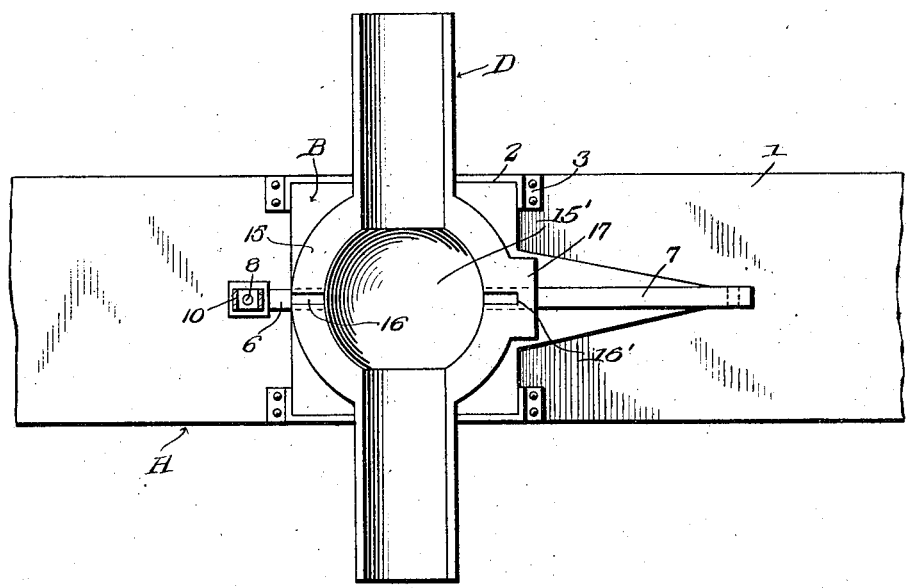

UNITED STATES PATENT OFFICE.

EARL BROCKETT, OF MURDOCK, FLORIDA.

SOCKET AND CLAMP FOR DIPPER STAFF-HANDLES.

1,237,163.  Specification of Letters Patent.  Patented Aug. 14, 1917.

Application filed July 25, 1916. Serial No. 111,246.

*To all whom it may concern:*

Be it known that I, EARL BROCKETT, a citizen of the United States, residing at Murdock, in the county of De Soto, and State of Florida, have invented new and useful Improvements in Sockets and Clamps for Dipper Staff-Handles, of which the following is a specification.

This invention relates to improvements in excavating machines and has particular application to a device for locking the dipper handle against movement within the crane.

The object is to produce an improved form of ball and socket joint whereof the socket is composed of two members movably mounted in the boom or other support, and the ball is made up of two complementary members, each consisting of one-half of a split sleeve and one-half of a hollow ball at the mid-length of said half of the sleeve, and peculiar devices to permit the assembly of the two members of the ball in such way that they may not move laterally, longitudinally, or axially upon each other and yet they may move toward each other when clamped within the socket so that the members of the ball element may be clamped upon the dipper handle.

An object of this invention is to provide the ball element with these several functions and possibilities and yet construct its two members or parts in such a way that they may be stamped or cast.

Another object of this invention is to provide a device of this character which contains the desirable features of simplicity, durability and efficiency, and furthermore, a device which may be readily manipulated by the operator on the deck of the machine.

Other objects of the invention will appear as the specification is read in connection with the accompanying drawings, in which:—

Fig. 3 is a vertical section of Fig. 2;

Fig. 4 is a horizontal central section of Fig. 2.

Figure 1:
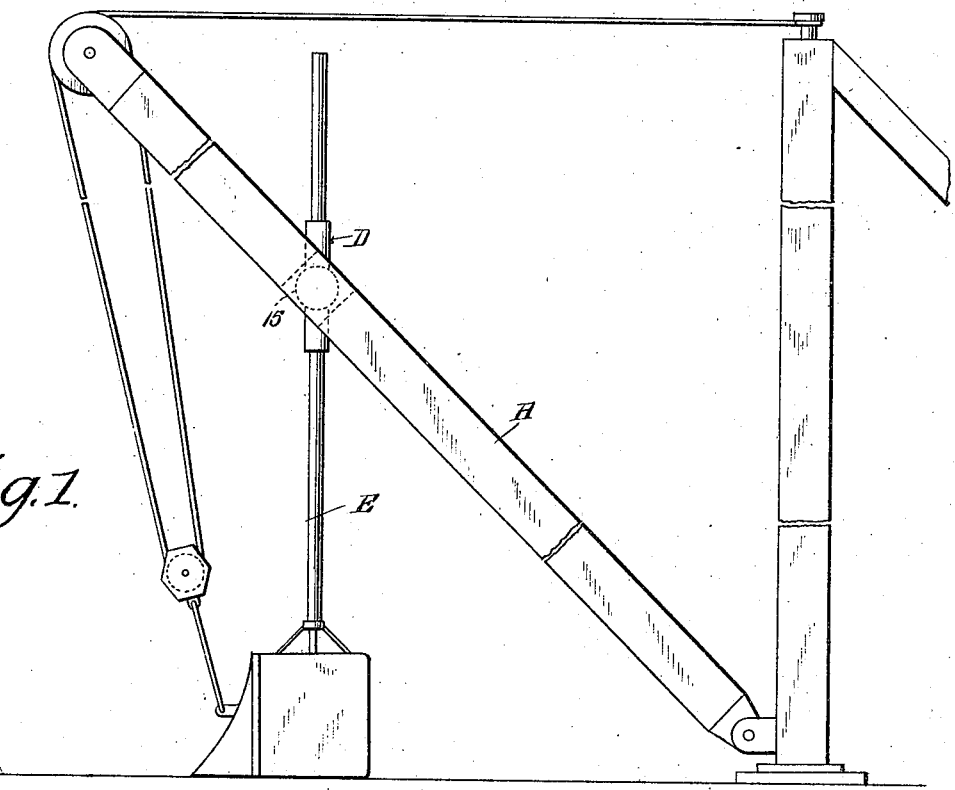
Figure 1 is a side elevation of the device showing the scoop handle and frame broken away.

Referring now to the drawings in detail, my invention comprises a boom A which is preferably of the skeleton type and which is provided with the parallel walls 1. Arranged upon the confronting faces of the walls 1 and at a point opposite each other are the frames 2, the frames upon each of the faces being of substantially U-shaped formation and arranged in spaced relation to each other, the free ends of each of the frames being arranged in confronting relation to each other. The opposite extremities of each of the frames 2 are provided with angularly disposed flanges 3 which are adapted to receive fastening members whereby the frames may be rigidly secured upon the crane. Loosely mounted in each pair of frames is a socket generally indicated as at B, the base of which is of rectangular formation so as to snugly engage the confronting faces of the frames 2, while the upper or outer face of the socket is provided with a concavity 5. The concavities stand opposite each other and form a socket or seat for the spherical head which will be hereinafter described. The opposite extremities of each of the sockets B are provided with extensions 6 and 7 respectively, the upper extensions 6 being relatively shorter than the lower extensions 7 and the upper extensions being pivotally connected to each other by a rod 8. The opposite extremities of the rod 8 are bifurcated to provide the knuckles 9 which are pivotally mounted upon the upper ends of the extensions 6 to permit movement of the socket members independently of each other. In this instance, I have shown the rod 8 formed of two sections which are adjustably connected to each other by the turn buckle 10, whereby the longitudinal dimensions of the rod may be varied to vary the relative movement of the sockets B as will be understood. The lower extensions 7 have their outer or free extremities connected by mechanism generally indicated as at C for moving the sockets B toward or away from each other. In this instance, I have shown the free extremities of the extensions 7 provided with links 11 and 12 respectively, the link 11 having one end thereof pivotally connected to one of the extensions 7 while the opposite extremity is pivotally connected to the medial portion of the bell crank lever 13. The short link 12 has one end pivotally connected to the other extension 7, while the opposite extremity is pivotally connected to the short arm of the bell crank lever 13. The free end or long arm of the bell crank lever 13 is adapted to receive one end of a flexible member 14 such as a chain or the like, the latter being of such a length as to extend to the deck of the excavating machine, whereby the operator may readily manipulate the same to actuate the mechanism C for moving the sockets B as will be hereinafter described.

Arranged between the sockets B is a split sleeve generally indicated as at D which is of any suitable length, the sections of which have their medial portions each provided with a semi-spherical head 15 and the two heads are so arranged as to form the spherical head or ball adapted to be engaged by the sockets B as is clearly shown in the drawings. The confronting faces of the semi-spherical heads 15 are cupped as seen at 15′ and their edges are provided with a transverse tongue and groove connection 16 whereby relative longitudinal movement of the sections of the sleeve will be prevented. This connection also prevents rotary movement of one member of the ball or one-half the sleeve on the other member or half. To prevent relative transverse movement of the sleeve members, the tongue and groove terminate short of one side as seen at 16′ in Fig. 3. To prevent excessive circumferential movement of the ball within the sockets B, I have provided the radial heads 15 with semi-circular projections 17 whose faces are arranged in confronting relation to each other while their side edges are adapted to abut the sockets B thus limiting the circumferential movement of the ball as will be understood. The projection 17 of one head overhangs the end of the tongue of the other head as seen at 17′ in Fig. 4, and thus completes the means for preventing the lateral movement of one member of the ball upon the other.

Mounted within the sleeve D is the dipper handle E which is here shown as a staff or rod circular in cross section so as to conform to the bore of the sleeve D and may be of any suitable length to perform the function for which it is intended. It will be noted that the handle E is of slightly greater diameter than the internal diameter of the sleeve whereby when the handle is inserted into the sleeve it will cause the sections of the sleeve to spread to permit the same to be compressed when it is desired to lock the handle against movement.

In practice, when it is desired to lock the handle E against movement in any direction and thereby prevent the dipper from overturning, by pulling upon the flexible member 14, the bell crank lever 13 will be rocked to draw the links 11 and 12 toward each other. This causes the sockets B to move toward each other and clamp the heads 15 and the sections of the sleeve upon the handle E and thus prevent circumferential or longitudinal movement of the handle, thus holding the dipper properly during the scooping operation. As previously stated, the upper ends of the sockets B are connected by the turn buckle 10 so that the relative movement of the sockets may be varied. It will thus be seen that the pressure of the sections of the sleeve D upon the handle E may be varied by adjustment of the turn buckle, so that the handle may be securely held against movement.

Figure 2:
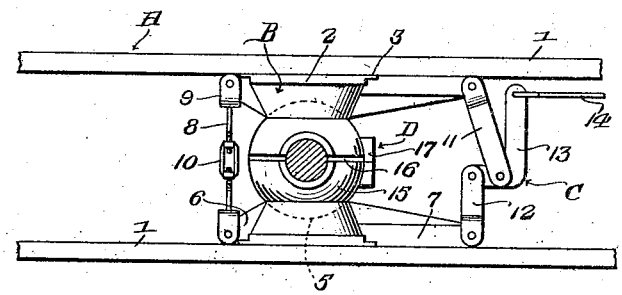
Fig. 2 is a top plan view of the device.

While I have shown and described this invention as applied to the handle E of a dipper or scoop forming part of an excavating machine, it is obvious that any round staff or rod could be clamped within the ball element when the members of the socket element are drawn together, or would be slidably held in the former when the members of the latter are not drawn together sufficiently to set up friction between the socket and ball. The peculiar construction of the parts or members of the ball element is such that they may be quickly passed over the round staff or rod and assembled thereon, and when one member comes directly opposite the other the tongue and groove connections engage and the bore of the split sleeve surrounds the staff while the halves thereof and the two halves of the ball are yet slightly spaced as seen in Fig. 2—hence the subsequent tightening of the link mechanism which draws the two members of the socket together will force the two members of the ball onto the staff so as to hold the latter therein with an amount of friction dependent on the force applied. The clamping action may be carried to such an extent that the staff will positively not slide through the ball, and the latter will hardly turn within the socket as is often necessary in excavating machines; or the clamping action may be such as will impart only a moderate degree of friction to the parts, or that the parts will be comparatively loose.

What I claim is:—

1. In a ball and socket joint, the combination with a support having parallel walls, frames thereon, a socket element comprising two members mounted in the frames and having opposite concavities, in their contiguous faces, and means for adjusting the members toward each other; of a ball element comprising two members, each including half of a split sleeve and a hemi-spherical head at the mid-length of such half and internally cupped, the meeting edges of the heads having means for holding them and the meeting edges of the halves of the sleeve in alinement when subjected to compression within the socket.

2. In a ball and socket joint, the combination with a socket element comprising spaced members having concavities in their confronting faces, and means for movably supporting said members; of a ball element comprising two members, each including half of a split sleeve and a hollow hemi-spherical head at the midlength of said half, the meeting edges of the heads having tongue and groove connections transverse to the length of the sleeve, and means for preventing excessive rotation of the ball within the socket when the latter is expanded.

3. In a ball and socket joint, the combination with a socket element comprising spaced members having concavities in their confronting faces, and means for movably supporting said members; of a ball element comprising two members, each including half of a split sleeve and a hollow hemispherical head at the mid-length of said half, the meeting edges of the heads having tongue and groove connections transverse to the length of the sleeve, and said heads also having radial projections extending beyond their outer faces at one end of said tongue and groove connection, and adapted to contact with the inner faces of the socket members to limit rotation of the ball therein.

4. In a ball and socket joint, the combination with a socket element made up of two spaced members, and a staff passing between them; of a ball element comprising two complementary members inclosing said staff, each including half of a split sleeve and a hollow hemi-spherical head at the mid-length of such half, the two heads having lateral projections at one side of the same on a line at right angles to the length of the sleeve, and the heads also having transverse tongue and groove connections between their meeting faces in line with said projections, the latter closing one end of such tongue and groove connections, for the purpose set forth.

In testimony whereof I affix my signature.

EARL BROCKETT.

Copies of this patent may be obtained for five cents each, by addressing the "Commissioner of Patents, Washington, D. C."